(12) United States Patent
Shang

(10) Patent No.: US 8,467,010 B2
(45) Date of Patent: Jun. 18, 2013

(54) LIQUID CRYSTAL DISPLAY MODULE

(75) Inventor: Fei Shang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 278 days.

(21) Appl. No.: 12/869,667

(22) Filed: Aug. 26, 2010

(65) Prior Publication Data

US 2011/0211138 A1    Sep. 1, 2011

Related U.S. Application Data

(63) Continuation-in-part of application No. 11/956,174, filed on Dec. 13, 2007, now abandoned.

(30) Foreign Application Priority Data

Apr. 11, 2007 (CN) .......................... 2007 1 0065342

(51) Int. Cl.
*G02F 1/1333* (2006.01)

(52) U.S. Cl.
USPC ............... 349/58; 349/65; 362/633; 362/97.2

(58) Field of Classification Search
USPC ............... 349/58, 65, 60; 362/633, 634, 632, 362/615, 611, 97.2, 97.1, 27
See application file for complete search history.

(56) References Cited

U.S. PATENT DOCUMENTS

| | | | |
|---|---|---|---|
| 6,392,724 B2 | 5/2002 | An et al. | |
| 6,502,945 B2 * | 1/2003 | Kim et al. | ........................ 362/27 |
| 7,095,461 B2 | 8/2006 | Kim | |
| 7,182,500 B2 | 2/2007 | Sugawara | |
| 7,374,330 B2 | 5/2008 | Weng et al. | |
| 7,567,316 B2 * | 7/2009 | Hu | ................................ 349/58 |
| 2007/0195225 A1 | 8/2007 | Lee | |

FOREIGN PATENT DOCUMENTS

| | | |
|---|---|---|
| CN | 1673832 A | 9/2005 |
| CN | 1912702 A | 2/2007 |
| KR | 2004-0001970 | 1/2004 |

OTHER PUBLICATIONS

Office Action for U.S. Appl. No. 11/956,174, mailed Jul. 2, 2009, pp. 1-7.
Office Action for U.S. Appl. No. 11/956,174, mailed Jan. 12, 2010, pp. 1-8.
Office Action for U.S. Appl. No. 11/956,174, mailed May 26, 2010, pp. 1-5.

* cited by examiner

*Primary Examiner* — Thoi Duong
(74) *Attorney, Agent, or Firm* — Ladas & Parry LLP

(57) ABSTRACT

There is provided a LCD module. The LCD module comprises a back plate, a light guiding plate provided on the back plate, an upper frame provided on the light guiding plate in contact with an edge of the light guiding plate, a liquid crystal display panel provided on the upper frame, and a silica gel pad disposed between the upper frame and the liquid crystal display panel. The surface of the silica gel pad that is in contact with the liquid crystal display panel is a curved surface.

6 Claims, 3 Drawing Sheets

LIQUID CRYSTAL DISPLAY MODULE

CROSS-REFERENCE TO RELATED APPLICATION

This application is a continuation-in-part of application Ser. No. 11/956,174, filed Dec. 13, 2007.

BACKGROUND OF THE INVENTION

The present invention relates to a liquid crystal display (LCD) module.

FIG. 1 is a cross-sectional view of a conventional LCD module. As illustrated in FIG. 1, the LCD module comprises a liquid crystal display panel 1, a metallic cheek 2, optical films 3, a silica gel pad 4, an upper frame 5, a light guiding plate 6, a metallic back plate 7, etc. When the above components are assembled together, the metallic back plate 7 acts as a basic reference, the light guiding plate 6 is fitted into the metallic back plate 7, and then the series of optical films 3 are disposed on the light guiding plate 6. When the matching at each position is proper, the upper frame 5 is fitted from the above and then the liquid crystal display panel 1 is disposed above the upper frame 5. The silica gel pad 4 is disposed at the contact region between the liquid crystal display panel 1 and the upper frame 5. Finally, the metallic cheek 2 is disposed above the liquid crystal display panel 1 and at the periphery of all the above assembled components.

In the above conventional LCD module, the silica gel pad 4 having a rectangular structure is used to control the spacing between the light guiding plate 6 and the liquid crystal display panel 1. Since the silica gel pad 4 has a poor elasticity and partially melts after being heated for a long time, the liquid crystal display panel 1 and the light guiding plate 6 adhere to each other and the liquid crystal display panel 1 has an instable reliability under the condition of high temperature and high humidity. Therefore, the problems of reliability, such as assembling gap display malfunction (Gap Mura) and display ripple phenomenon (Ripple), will occur.

In addition, the light guiding plate 6 affects the reliability of the liquid crystal display panel 1 if the light guiding plate 6 can be not controlled properly, since the light guiding plate 6 is made of polymethyl methacrylate (PMMA) and deforms when absorbing water.

The conventional LCD module prevents warp of the optical films 3 and bending of the light guiding plate 6 through the upper frame 5, and thereby prevents foreign particles from entering the display region in the LCD. Such design of the conventional LCD module is disclosed, for example, in U.S. Pat. No. 7,095,461, but this prior design still has some difficulty in operation.

SUMMARY OF THE INVENTION

In view of the above problems, there is provided a liquid crystal display (LCD) module in embodiments of the present invention.

In an embodiment of the present invention, there is provided a LCD module. The LCD module comprises a light source, a back plate, a light guiding plate, an upper frame, a liquid crystal display panel and a silica gel pad. The light guiding plate may be provided on the back plate. The light guiding plate may comprise a top surface, a bottom surface, a first, a second, a third and a fourth side surface. The second and the fourth side surfaces are disposed opposite to each other and face the light source. The first and the third side surfaces are disposed opposite to each other and do not face the light source. The upper frame is provided on the light guiding plate in contact with an edge of the light guiding plate. The upper frame may comprise a rib structure in contact with the top surface of the light guiding plate at the edges adjacent to the first and third side surfaces. The liquid crystal display panel may be provided on the upper frame. The silica gel pad may be disposed between the upper frame and the liquid crystal display panel. The surface of the silica gel pad that is in contact with the liquid crystal display panel is a curved surface.

Preferably, the curved surface of the silica gel pad is a waved surface, a zigzag surface or a concavo-convex surface, and more preferably the silica gel pad has compression resistant elasticity.

Preferably, the rib structure may have a cross section in a shape of square, rectangle, trapezium, triangle or corona. The rib structure may be integrally formed with the upper frame or may be separately formed and provided on the upper frame.

Compared with the conventional LCD module, the LCD module according to the embodiment of the present invention renders the acting force applied on the liquid crystal display panel more uniform and prevents malfunction caused by some positions that are unevenly subject to force, by providing a new silica gel pad between the liquid crystal display panel and the upper frame. In addition, presence of the new silica gel pad and reduction of the contact area of the silica gel pad with the liquid crystal display panel by the curved surface can resolve the problem of partially melting of the silica gel pad under the condition of high temperature and high humidity and the problem of difficulty in separating the liquid crystal display panel from the conventional silica gel pad during rework or repair. Further, the uniform contact between the liquid crystal display panel and the silica gel pad can prevent foreign particles from entering the display region of the liquid crystal display module.

In addition, compared with the related art, according to the embodiment of the present invention, since the rib structure of the upper frame can apply acting force on the two ends of the light guiding plate in the horizontal direction, the deformation of the light guiding plate can be controlled properly, thereby improving the reliability of the liquid crystal display module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Figure 1:
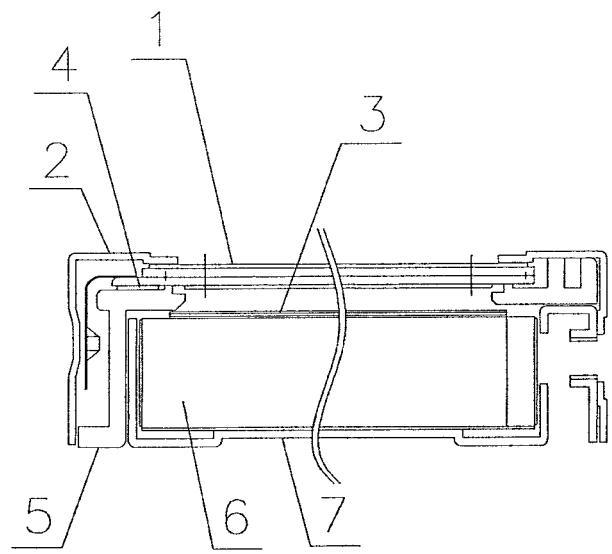
FIG. 1 is a cross-sectional view of the structure of a conventional LCD module.

Exemplary embodiments of the present invention will be described hereinafter with reference to the accompanying drawings. However, the present invention can be realized in different ways and should not be limited to the embodiments set forth hereinafter. In the description, when a layer or a element is referred to as being "on" or "connected to" another layer or element, this layer or element can be directly on or directly connected to the other layer or element, or an intervening layer may also be present therebetween. In the drawings, the elements are not drawn to scale and may be exaggerated for the purpose of clarity.

Figure 2:
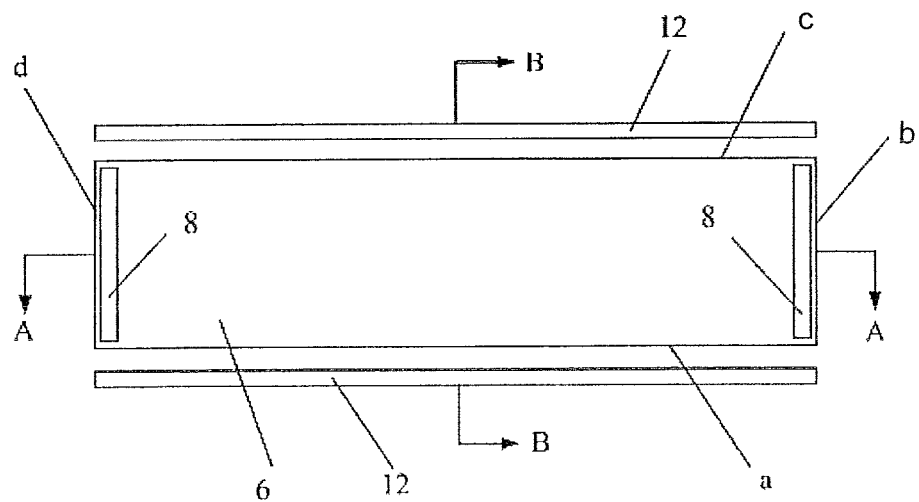
FIG. 2 is a schematic plan view showing a LCD module according to an embodiment of the present invention.
Figure 2A:
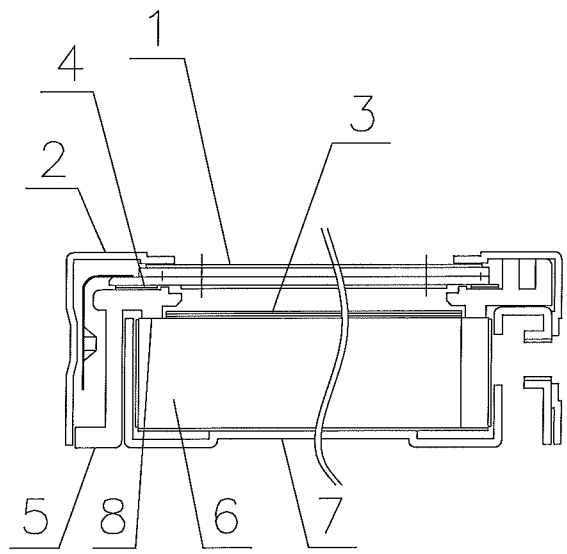
FIG. 2A is a cross-section view taken along line A-A in FIG. 2.
Figure 2B:
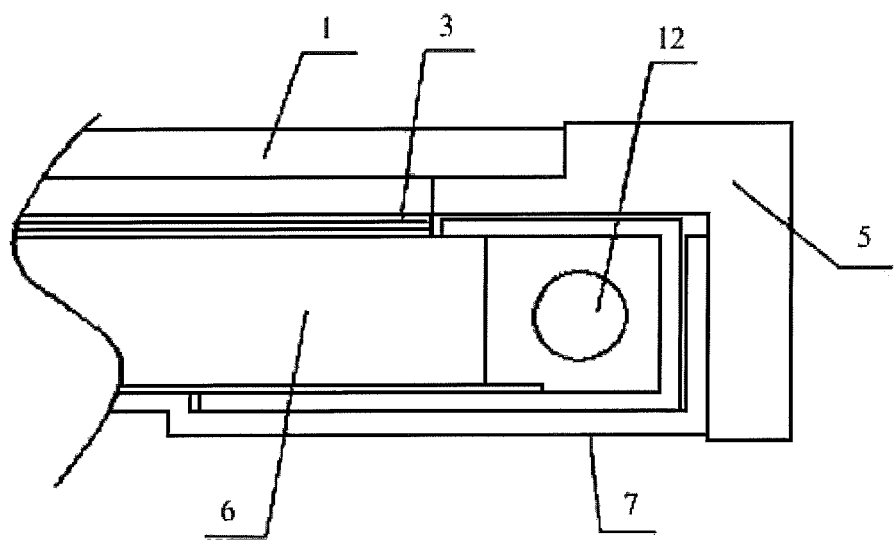
FIG. 2B is a cross-section view taken along line B-B in FIG. 2.

FIG. 2 is a schematic plan view showing a LCD module according to an embodiment of the present invention, FIG. 2A is a cross-section view taken along line A-A in FIG. 2, and FIG. 2B is a cross-section view taken along line B-B in FIG. 2. As illustrated in FIGS. 2, 2A and 2B, the LCD module comprises a metallic cheek 2, optical films 3, a light source 12, a back plate 7, a light guiding plate 6, an upper frame 5, a liquid crystal display panel 1 and a silica gel pad 4. The light guiding plate 6 is provided on the back plate 7. The light guiding plate 6 comprises a top surface, a bottom surface and four side surfaces, that is, a first side surface a, a second side surface b, a third side surface c and a fourth side surface d. The second and the fourth side surfaces b and d are disposed opposite to each other and face the light source 12. The first and the third side surfaces a and c are disposed opposite to each other and do not face the light source 12. The upper frame 5 is provided on the light guiding plate 6 in contact with an edge of the light guiding plate 6. The upper frame may comprise a rib structure 8 in contact with the top surface of the light guiding plate 6 at the edges adjacent to the first and third side surfaces a and c. The liquid crystal display panel 1 is provided on the upper frame 5. The silica gel pad 4 is disposed between the upper frame 5 and the liquid crystal display panel 1. The surface of the silica gel pad 4 that is in contact with the liquid crystal display panel 1 is a curved surface.

Figure 3:
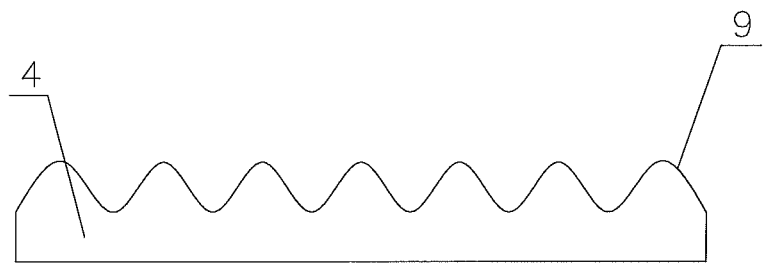
FIG. 3 is a schematic view of the cross section of the silica gel pad in a normal state according to the embodiment.

In the LCD module according the embodiment, the silica gel pad 4 in new configuration is provided. As illustrated in FIG. 3, the silica gel pad 4 in the embodiment of the present invention has a curved surface in contact with the liquid crystal display panel 1, that is, the upper surface of the silica gel pad 4 in FIG. 3, and for example, the silica gel pad 4 has a wave shaped structure. The silica gel pad 4 can have various curved surfaces, such as zigzag, concavo-convex, etc. Furthermore, the silica gel pad 4 has compression resistant elasticity. In the embodiment of the present invention, the upper frame 5 has a protruding rib structure 8 thereon, which is different from that of the conventional LCD module.

As illustrated in FIG. 2, when the above-mentioned components are assembled together to form a LCD module, the metallic back plate 7 acts as a basic reference, the light guiding plate 6 is fitted into the metallic back plate 7, and then the series of optical films 3 are disposed on the light guiding plate 6. When the matching at each position is proper, the upper frame 5 is fitted from the above and then liquid crystal display panel 1 is disposed above the upper frame 5. The silica gel pad 4 is disposed at the contact region between the liquid crystal display panel 1 and the upper frame 5, and the curved surface of the silica gel pad 4 is in contact with the liquid crystal display panel 1. Finally, the metallic cheek 2 is disposed above the liquid crystal display panel 1 and at the periphery of all the above assembled components.

Figure 4:
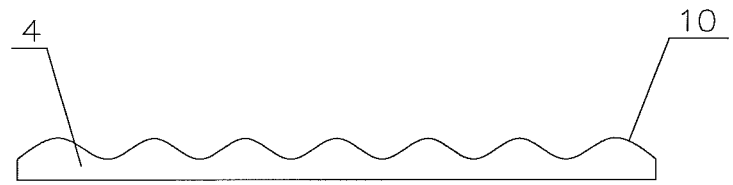
FIG. 4 is a schematic view of the cross section of the silica gel pad in a compression state according to the embodiment.
Figure 5:
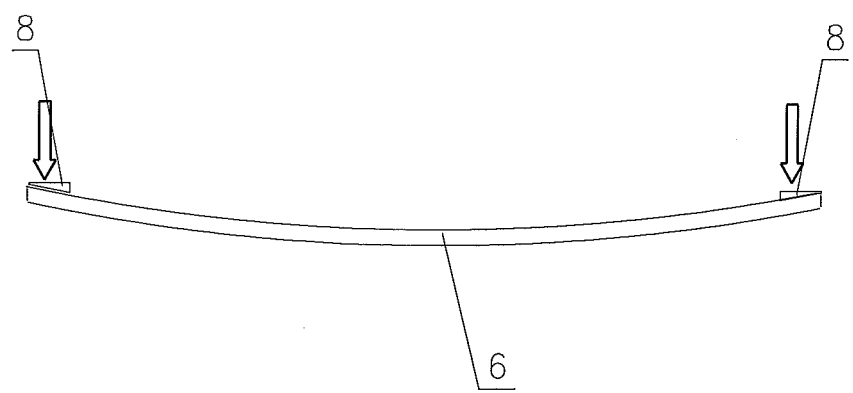
FIG. 5 is a schematic view illustrating how a rib structure of an upper frame of the LCD module controls deformation of a light guiding plate.

The rib structure 8 is provided on the lower surface of the upper frame 5 of the embodiment and helps to fix the light guiding plate 6 in the cavity of the metallic back plate 7, thereby effectively reducing the influence on the whole backlight source which is caused by deformation of the light guiding plate 6 due to change of the temperature. In the embodiment of the present invention, with the inclined surface of the silica gel pad 4, the possible light leakage of the backlight source can be effectively prevented. The silica gel pad 4 is provided on the upper side of the upper frame 5. Since the silica gel pad 4 has a curved surface in contact with the liquid crystal display panel 1, the pressure of the liquid crystal display panel 1 can be effectively absorbed by the silica gel pad 4 and the malfunction caused in the liquid crystal display panel 1 under applied pressure can be prevented. As illustrated in FIG. 3, the silica gel pad 4 of the present invention has a cross section curve 9 in a normal state when there is no pressure applied thereon. When the silica gel pad 4 is subject to the acting force applied in the perpendicular direction, the silica gel pad 4 changes to have a cross section curve 10 in a compression state, as illustrated in FIG. 4. With the curved surface, the silica gel pad 4 is in line contact with the liquid crystal display panel 1 in the embodiment of the present invention, while in the conventional LCD module, the silica gel pad 4 in a rectangle shape is in surface contact with the liquid crystal display panel 1. Therefore, the contact area between the liquid crystal display panel 1 and the silica gel pad 4 is considerably reduced in the embodiment of the present invention, and the liquid crystal display panel 1 is uniformly subjected to acting force, thereby preventing malfunction of the image display caused by some positions in the liquid crystal display panel 1 being overstressed. In the conventional LCD module, the conventional silica gel pad tends to partially melt in the condition of high temperature and high humidity, and thus it is difficult to separate the liquid crystal display panel 1 from the conventional silica gel pad 4 when the liquid crystal display module needs to be reworked or repaired. The silica gel pad 4 in the embodiment of the present invention can effectively resolve this problem, since the contact area is reduced between the silica gel pad 4 and the liquid crystal display panel 1. In addition, the liquid crystal display panel 1 and the silica gel pad 4 are uniformly contacted with each other, preventing foreign particles from entering the display region of the LCD module of the embodiment of the present invention. Furthermore, since the rib structure 8 of the upper frame 5 in the embodiment can apply acting force to the two ends of the light guiding plate in the horizontal direction, the deformation of the light guiding plate can be controlled.

In the embodiment of the present invention, the curved surface of the silica gel pad 4 can be changed to various forms, for example, those mentioned above. In addition, the cross section shape of the rib structure 8 of the upper frame can be modified in various ways, such as triangle, rectangle, square, trapezium, corona, etc.

The rib structure 8 of the upper frame 5 according to the embodiment of the present invention can be formed integrally with the body of the upper frame, and also can be formed separately and then provided on the upper frame.

Although the present invention has been described in detail referring to the preferred embodiments, the above embodiments are used only for illustration and not for the purpose of limitation. Accordingly, it will be understood by those of ordinary skill in the art that it is possible to use other materials and equipments if necessary, and that various modifications or equivalent alterations may be made to the embodiments of the present invention without departing from the spirit and scope of the present invention as set forth in the following claims.

What is claimed is:

1. A liquid crystal display module, comprising:
   a light source,
   a back plate,
   a light guiding plate provided on the back plate, wherein the light guiding plate comprises a top surface, a bottom surface, a first, a second, a third and a fourth side surfaces, and the second and the fourth side surfaces are disposed opposite to each other and face the light source, the first and the third side surfaces are disposed opposite to each other and do not face the light source,
   an upper frame provided on the light guiding plate in contact with an edge of the light guiding plate, wherein the portions of the upper frame comprises a rib structure in contact with the top surface of the light guiding plate at the edges only adjacent to the first and third side surfaces,
   a liquid crystal display panel provided on the upper frame, and
   a silica gel pad disposed between the upper frame and the liquid crystal display panel,
   wherein the surface of the silica gel pad that is in contact with the liquid crystal display panel is a curved surface.

2. The liquid crystal display module according to claim 1, wherein the curved surface is a waved surface, a zigzag surface or a concavo-convex surface.

3. The liquid crystal display module according to claim 1, wherein the silica gel pad has compression resistant elasticity.

4. The liquid crystal display module according to claim 1, wherein the rib structure has a cross section in a shape of square, rectangle, trapezium, triangle or corona.

5. The liquid crystal display module according to claim 1, wherein the rib structure is integrally formed with the upper frame.

6. The liquid crystal display module according to claim 1, wherein the rib structure is separately formed and provided on the upper frame.

* * * * *